G. E. MAYNARD.
COIL BOX.
APPLICATION FILED JAN. 12, 1921.
1,404,627.
Patented Jan. 24, 1922.
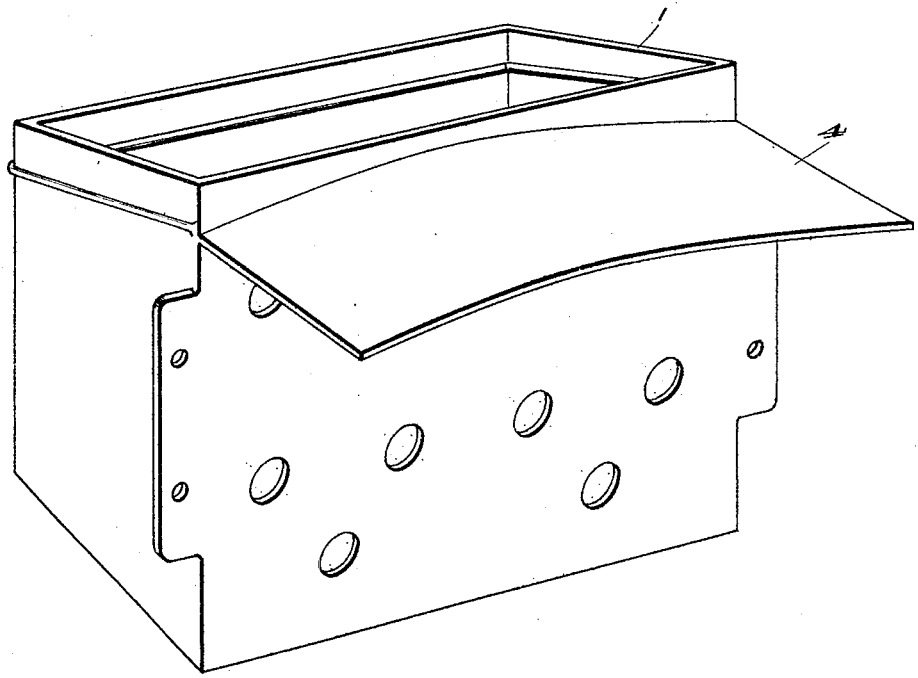
Fig. 1.
Fig. 2.
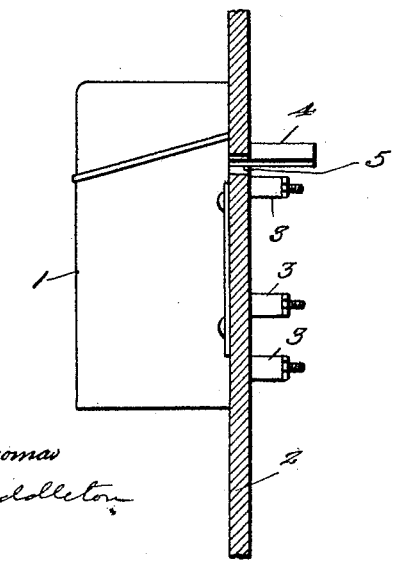
R. A. Thomas
L. B. Middleton
WITNESSES
G. E. Maynard  INVENTOR
BY Victor J. Evans
ATTORNEY

UNITED STATES PATENT OFFICE.

GRADY E. MAYNARD, OF BARNESVILLE, GEORGIA.

COIL BOX.

1,404,627.  Specification of Letters Patent.  Patented Jan. 24, 1922.

Application filed January 12, 1921. Serial No. 436,811.

*To all whom it may concern:*

Be it known that I, GRADY E. MAYNARD, a citizen of the United States, residing at Barnesville, in the county of Pike and State of Georgia, have invented new and useful Improvements in Coil Boxes, of which the following is a specification.

This invention relates to improvements in coil boxes of automobiles and the like, the principal object of the invention being to provide a projecting part on the box for protecting the terminals from the water which may leak through the hood and cowl of the automobile and short circuit the ignition system.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a coil box constructed in accordance with my invention.

Figure 2 is a sectional view showing the same applied to the dash of an automobile.

In these views 1 indicates the coil box for containing the coils of the ignition system, this box being secured to the dash 2 of the automobile. The terminals 3 pass through holes in the dash and any water leaking through the cowl and running down the dash will short circuit the ignition system at the terminals. To prevent this I place a roof piece 4 on the inner side of the box and this piece projects through a slot 5 made in the dash and extends over the ends of the terminals so as to drain the water running down the dash away from said terminals. This piece slopes downwardly towards each end from its middle and is preferably formed integral with the box though it may be suitably secured to said box if desired such as by solder. It must make a water tight joint.

It will thus be seen that the roof piece will prevent the water from coming in contact with the terminals, thus preventing short circuiting of the ignition system.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with the coil box and dash of an automobile and the terminals of the box, said dash having a slot therein arranged above the terminals, a roof piece connected with the inner side of the box and extending through said slot, said roof piece sloping from its center towards each end for protecting the terminals from the water running down the dash.

In testimony whereof I affix my signature.

GRADY E. MAYNARD.